(12) United States Patent
Nicholson et al.

(10) Patent No.: US 7,873,228 B2
(45) Date of Patent: Jan. 18, 2011

(54) SYSTEM AND METHOD FOR CREATING SYNTHETIC LIGATURES AS QUALITY PROTOTYPES FOR SPARSE MULTI-CHARACTER CLUSTERS

(75) Inventors: Dennis G. Nicholson, Atherton, CA (US); Robert Filippini, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1041 days.

(21) Appl. No.: 11/359,199

(22) Filed: Feb. 21, 2006

(65) Prior Publication Data

US 2007/0196021 A1    Aug. 23, 2007

(51) Int. Cl.
    *G06K 9/40* (2006.01)
(52) U.S. Cl. ........... 382/254; 382/178; 382/179; 382/186; 382/187; 382/188; 382/189; 382/216; 382/260; 382/275
(58) Field of Classification Search ............ 382/178, 382/179, 186, 187, 188, 189, 216, 254, 260, 382/275, 295
    See application file for complete search history.

(56) References Cited

U.S. PATENT DOCUMENTS

| | | | | |
|---|---|---|---|---|
| 4,153,897 A | * | 5/1979 | Yasuda et al. | 382/216 |
| 4,654,873 A | * | 3/1987 | Fujisawa et al. | 382/178 |
| 4,887,301 A | * | 12/1989 | Hodgens et al. | 382/178 |
| 6,069,978 A | * | 5/2000 | Peairs | 382/254 |

OTHER PUBLICATIONS

Gonzalez et al., Digital Image Processing, Recognition Based on Decision-Theoretic Methods, 2008, Pearson Prentice Hall, pp. 869-871.*

* cited by examiner

*Primary Examiner*—Vikkram Bali
*Assistant Examiner*—Daniel Zeilberger
(74) *Attorney, Agent, or Firm*—Schwegman, Lundberg & Woessner, P.A.

(57) ABSTRACT

A method identifying a ligature within a scanned document, the ligature including two or more touching characters. The two or more touching characters of the ligature are then compared to a plurality of prototypes to identify two or more matched prototypes. A synthetic ligature is then created based on the two or more matched prototypes.

34 Claims, 6 Drawing Sheets

SYSTEM AND METHOD FOR CREATING SYNTHETIC LIGATURES AS QUALITY PROTOTYPES FOR SPARSE MULTI-CHARACTER CLUSTERS

FIELD

This application relates to a method and system for improving quality of a scanned image by creating, according to one embodiment, synthetic ligatures as quality prototypes for sparse multi-character clusters.

BACKGROUND

Scanned documents currently make up a large portion of today's correspondence between parties. However, the quality of these scanned documents varies greatly depending upon various factors, such as scanner quality, selected scan resolution, and quality of the original document, etc. If the quality of the scanned document is poor enough, it may be difficult to read or unreadable.

A particular issue with scanned documents is the occurrence of ligatures, which are two or more touching characters. For example, "f" is often touching "i" to make a "fi" ligature or two "f"s are touching for a "ff" ligature. Some processing of the scanned images may be done to create more visually appealing characters in an attempt to create a higher visual quality document. However, because the scanned images representing ligatures are generally so infrequent within the scanned document, it is difficult to create a more visually appealing ligature. The result is a visually inconsistent and unappealing document.

SUMMARY

According to an example aspect, there is provided a method of improving quality of a scanned document. A scanned document is received and a ligature may be identified within the scanned document, wherein the ligature includes two or more touching characters. A plurality of prototypes is compared against the one or more touching characters of the identified ligature to identify two or more matched prototypes. A synthetic ligature may then be created for the ligature based on the two or more matched prototypes.

Other features will be apparent from the accompanying drawings and from the detailed description that follows.

BRIEF DESCRIPTION OF DRAWINGS

An embodiment is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details. In one example embodiment, a glyph may be a unique characteristic shape or representation of a type character. The true shape of a glyph may be a set of equations precisely defining its outline. A type character (hereinafter interchangeable with "character type") may be a named or labeled glyph (e.g., the letter "a"). A ligature may be a glyph of two or more touching type characters. A blob may be a scanned image of one or more glyphs, and may include a scanned image of a ligature. A cluster may be a collection of blobs (e.g., similar blobs). A sparse multi-character cluster may be a cluster containing a few blobs (e.g., 10 or less, this threshold may be configurable), which may correspond to ligatures. A prototype may be an idealized representation of a cluster. A font may be a collection of type characters (e.g., having a common typeface design and size (e.g., 12 pt. Helvetica Bold)). A synthetic font may be a font that is derived from scanned glyphs. A synthetic font may be generated by an unknown "normal" font, and may include labeled prototypes derived from each cluster (e.g., an idealized variation of the letter "a"). A scanned image may be data produced by a document imaging device (e.g., a scanner). The data of the scanned image may then be processed and used to generate a visual representation of the original document.

In an example embodiment, an automated analysis of scanned glyph images (blobs) from a scanned document may be used to derive synthetic fonts, which may be used to generate a perceptually lossless reproduction of the original document with higher quality text. Even in cases where the scanned image is an infrequently occurring ligature (e.g., two or more touching type characters), a synthetic font may be created that is a higher quality representation of the original ligature while still preserving its original spacing and orientation as found in the original document. In the example embodiment, this automated methodology is able to accommodate distortion in the original document, which for example, might be caused by multiple generations of photocopying, faxing, and scanning.

Figure 1:
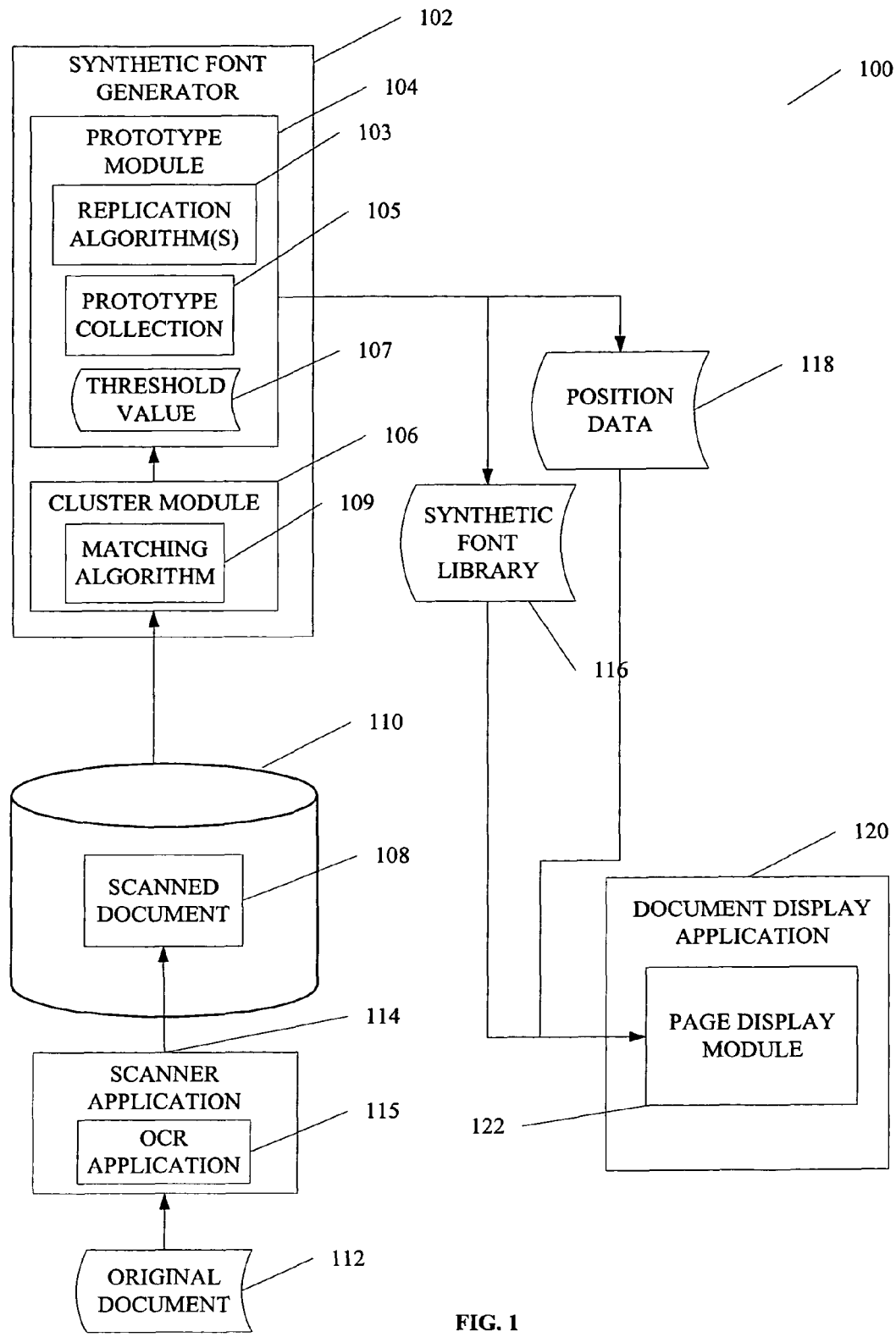
FIG. 1 is a diagrammatic representation of a system used in an example embodiment to produce a higher quality and perceptually lossless version of a scanned document.

FIG. 1 is a block diagram illustrating a system 100, according to an example embodiment, configured to produce a high quality (e.g., a perceptually lossless) version of a scanned document. The system 100 includes a synthetic font generator 102, which in turn includes a prototype module 104 and a cluster module 106. The cluster module 106 receives a scanned document 108 from a data storage device 110. In one embodiment, the scanned document 108 may be created from an original document 112 that has been processed via a scanner application 114 and optionally an OCR (Optical Character Recognition) application 115. The OCR application 115 may be implemented in computer software and configured to translate images of typewritten text (e.g., glyphs), which may be captured by the scanner application 114, into machineeditable text, or to translate pictures of characters into a standard encoding scheme representing them (ASCII or Unicode).

Figure 2:
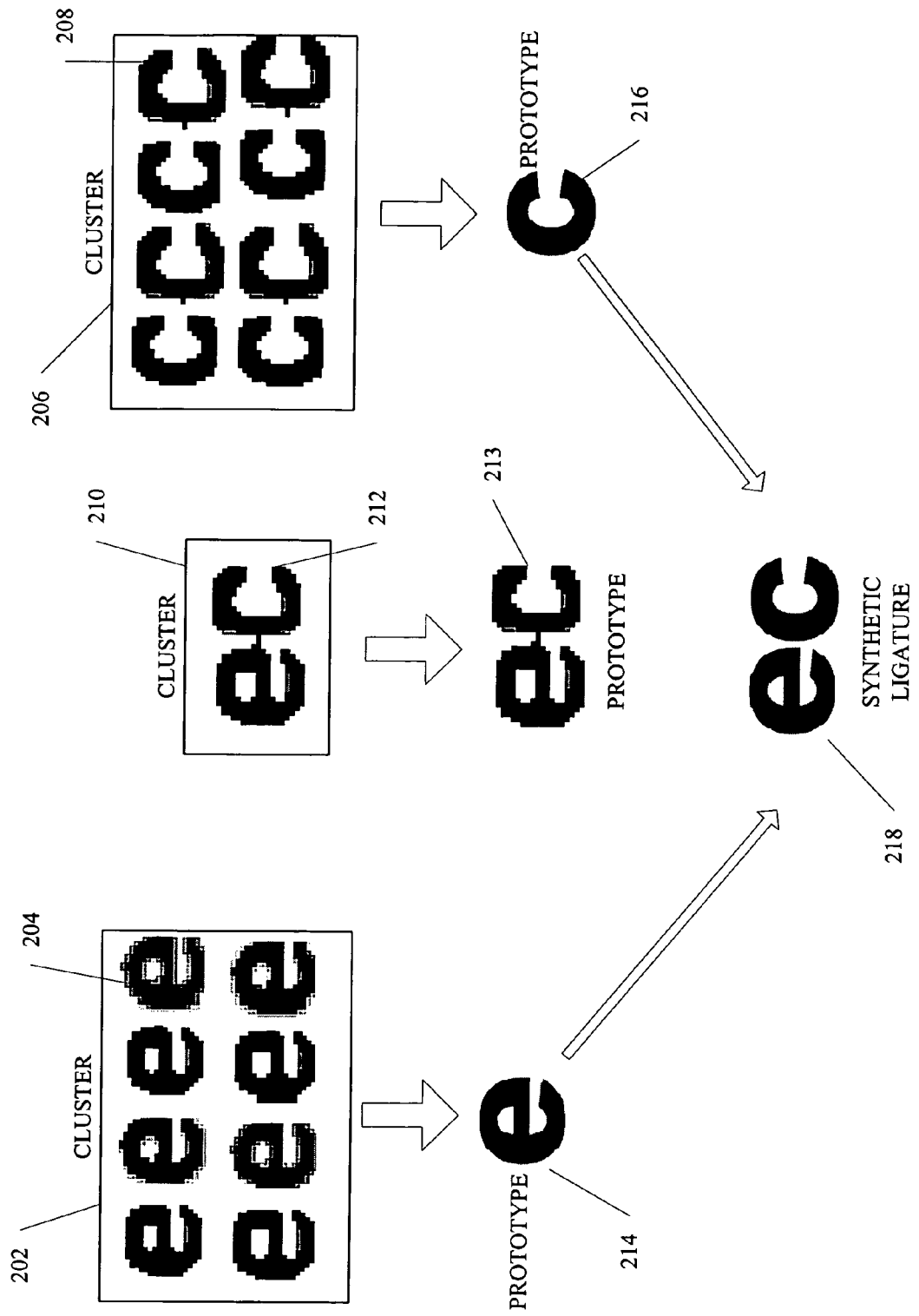
FIG. 2 illustrates examples of blobs, clusters and prototypes according to an example embodiment.

The scanned document 108 is composed of data in the form of blobs, which represent scanned images of glyphs. There may also be blobs that are ligatures, which are glyphs composed of two or more touching characters. The cluster module 106 may extract the blobs from the scanned image and group visually similar blobs into clusters. FIG. 2 illustrates examples of blobs, clusters and prototypes. Cluster 202 and cluster 206 each include a blob set 204 and a blob set 208, respectively. Cluster 210 includes a blob 212, which is a ligature as indicated by the two touching characters.

In one embodiment, the cluster module 106 utilizes a matching algorithm 109 to compare each blob against the other blobs of the scanned document to create each cluster. The matching algorithm 109 may include overlaying pairs of glyphs on a common grid and may count the percentage of grid cells wherein both glyphs have the same color (e.g., black). Ligatures are similarly grouped; however due to the low probability of a ligature occurring there maybe as few as one ligature in a cluster. It will be appreciated that many algorithms may exist for the matching algorithm 109 that may match blobs within the scanned document 108, and which algorithm implemented may be a design choice based on such factors as hardware and/or software capabilities.

Once the cluster module 106 generates the clusters 202, 206, and 210, the prototype module 104 may create a prototype collection 105 for each cluster. For example, the cluster module 106 may create the prototype collection 105 composed of prototypes 213, 214 and 216 from clusters 210, 202 and 206, respectively. In one embodiment, the prototype module 104 may process the blobs (e.g., single character and ligatures) of each cluster using one or more replication algorithms 103 to create a prototype that is a more accurate replica of the true shape of the original glyph than is any of the individual blobs. In another embodiment, the prototype module 104 may only processes the blobs of a cluster using the one or more replication algorithms 103 if the number of blobs within a cluster exceeds a minimum threshold value. The prototype module 104 may perform a count operation on the single type character clusters and ligature clusters to determine a type character and ligature count within each cluster. The prototype module may then process each cluster using the one or more replication algorithms 103 to create each prototype if the count for each cluster exceeds a threshold value 107 (e.g., >50 blobs in a cluster). The details for creating a higher quality ligature (e.g., synthetic ligature 218) are discussed in further detail below.

In various embodiments, the minimum threshold value may be configurable and/or may be based on which selected prototype algorithm is used to generate the prototype. For example, if the number of blobs within a cluster exceeds thirty, the prototype module 104 may align or overlay each blob of the cluster (e.g., from blob set 204 of cluster 202) with respect to an axis and boundary position (e.g., bottom left corner of each blob), and then perform a pixel by pixel comparison of each blob to create the prototype. If more than half of the blobs have a common pixel, the prototype module 104 then may add that pixel to the prototype. A similar analysis may be done for all the corresponding pixels of the blobs in the cluster until the prototype is complete. An example algorithm for creating a prototype may include the use of fractional pixel shifts for achieving optimal blob alignment or the creation of gray prototypes where the blackness of each prototype pixel reflects the percentage of glyphs having a corresponding black pixel. For example, if 30 of 40 overlaid glyphs have a black pixel in a grid cell, then the shade of the corresponding prototype pixel is 75 percent black.

It will be appreciated that many algorithms may exist for creating a prototype that is a more accurate replica of the true shape of the original glyph, and which algorithm used may be a design choice based on such factors as hardware and/or software capabilities.

Returning to FIG. 2, the prototype module 104, as described above, may process the blob set 204 of cluster 202 to generate a prototype 214 ("e"), which represents a high quality replica of the true shape of the blob in blob set 204. Similarly, the prototype module 104 may process the blob set 208 of cluster 206 to generate a prototype 216. However, if a cluster contains a small number of blobs, such as a sparse multi-character (e.g., ligature) cluster represented by blob 212 in cluster 210, then the created prototype 213 will be of limited value because it will have approximately the same noisy quality as the one or more blobs themselves (the original ligature). This is generally the case with ligatures since they occur so infrequently within a scanned document.

In one embodiment, to overcome a sparse multi-character ligature, the prototype module 104 identifies the two or more type characters (or character types, e.g., the character "e") of the ligature and creates a synthetic ligature (e.g., synthetic ligature 218) to replace the inadequate prototype (e.g., prototype 213) based on previously generated prototypes matched to the same type characters identified in the ligature. In one embodiment, the prototype module 104 labels each prototype according to its character type (e.g., "e," "c," etc.) based on the scanned document 108's OCR data. In other words, the type character(s) of the blobs within the clusters (e.g., blob set 204 and blob 212 (ligature)) are known prior to the generation of each prototype via the scanned document 108 and the scanner application 114, and the prototype module 104 labels each prototype accordingly. For example, the prototype 214 is labeled as the type character "e," the prototype 216 is labeled the type character "c," and the prototype 213 is labeled an "ec" ligature.

In another embodiment, the prototype module 104 may apply an OCR process, similar to that provided by OCR application 115, to each prototype to identify and label the type character or ligature type characters of each prototype. It will be noted that multiple clusters may exist for an identified type character. For example, there may be three variations of the type character "a" based on physical attributes and their associated attribute values, such as type style (e.g., boldness), page skew, copier scaling, etc. Therefore, each variation of "a" has a unique cluster that may be processed to generate three unique prototypes corresponding to each variation of the type character "a."

In one embodiment, after the type characters of the ligature have been identified, the prototype module 104 may use partial template matching to match each type character identified in the ligature (e.g., "e" and "c") to a similar collection of prototypes. The prototype module 104, in using partial template matching, may compare the geometric features of each type character of the ligature with the geometric features of each prototype until a match is found. Geometric features, for example, may include character, prototype and ligature attributes having attribute values, such as a character pixel value, a character dimension value, a ligature pixel value, and a ligature dimension value. A match may be determined, for example, by an overlay or other such comparison algorithm. For example, a "ec" ligature (e.g., prototype 213) has a left edge and a baseline, which together in partial template matching determine an initial position of a prototype "e" (e.g., prototype 214) atop the "e" of the ligature (e.g., line up the left edges and the baselines of the prototype and the ligature). However, this may not be a precise enough placement to get most of the pixels of each "e" to line up. In one example embodiment, the prototype module 104 may try a multitude of placements by adjusting the initial position by, for example, 1 or 2 pixels vertically and/or horizontally.

In another embodiment, the prototype module 104 may use the initial placement (using left edge and baseline) and examine the pixels in an XOR (exclusive OR) difference. For enhanced performance, rather than trying a multitude of placements, careful examination of the initial placement suggests which direction to shift to try a subsequent placement. For example, if the prototype 214 is overlaid onto the (ligature) prototype 213, the edges of the prototype 214 relative to the prototype 213 may be examined to determine which way to adjust the placement of the prototype 214 to achieve an accurate alignment. If a vertical edge in the prototype 214 lines up perfectly with a vertical edge in the prototype 213, which may indicate a good horizontal alignment. On the other hand, if the vertical edge of the prototype 214 lies to the right (left) of the vertical edge of the prototype 213, that may indicate that the prototype 214 should be moved to the left (right). By examining this piece of edge, a counter H (horizontal index) may be incremented to indicate good horizontal alignment, a counter xP to indicate that the prototype 214 should be moved to the right (relative to the prototype 213), or a counter xN to indicate the prototype 214 should be moved to the left. In a similar fashion, a counter V (vertical index) may be incremented to indicate good vertical alignment, a counter yP to indicate that the prototype 214 should be moved up (relative to the prototype 213), or a counter yN to indicate the prototype 214 should be moved down. These counters may then be adjusted upon further examination of other portions of the relative edges of each blob.

In another example, the prototype 214 may be overlaid onto the prototype 213 using their respective left edges and baseline, and if a certain black pixel of the prototype 214 lies above a white pixel of the prototype 213, and if an examination of the 8 neighbors of the white pixel in the prototype 213 shows 2 black pixels that lie to the right, then this may suggests that the initial placement should be moved one pixel to the right. In this way, as discussed above, counters xP, xN, yP, and yN are calculated which suggest moving one pixel either horizontally or vertically, respectively. Additionally, certain pixel examinations may suggest that no further horizontal or vertical movement should occur. For example, if within one row of the prototype 214 there are 3 consecutive pixels which are 0, 1, 1(meaning off, on, on), and if the corresponding pixels of the prototype 213 are identical, the horizontal counter H (H index) may be incremented to a "horizontal lock" position.

In one embodiment, the H and V indices may be calculated as follows. The counter H is initialized to 0. A horizontal transition pixel of a prototype (e.g., prototype 214) is one that is on with either the pixel to the left or right being off. For example, if a horizontal transition pixel, P, of the prototype 214 lies above a horizontal pixel, P', of prototype 213 and if the pixel on the left of P agrees with the pixel left of P'(e.g., both on or both off) and if also the pixel on the right of P agrees with the pixel on the right of P', then H is incremented. The V index may be similarly calculated.

Thus a horizontal stability index H and a vertical stability index V may be calculated, which together with xP, xN, yP, and yN suggest which way (if any) to try a subsequent placement. One or two iterations of this process may suggest how the ligature blob may be cut into pieces corresponding to each prototype. The centroid of the prototype may then be aligned with the centroid of each piece to get precise positioning. It will be appreciated that many algorithms may exist for comparing the ligature and the prototype, and which algorithm used may be a design choice based on such factors as hardware and/or software capabilities.

As discussed above, there may be multiple prototypes (from multiple clusters) for a single type character. As a result, the prototype module 104 may compare each prototype to the corresponding identified type character of the ligature. For example, if three prototypes (from three unique clusters) were generated for the character "e," then the prototype module 104 may compare each of the "e" prototypes with the "e" identified within the ligature. The closest matching "e" of the three prototypes may then be selected to represent the "e" portion of the synthetic ligature. Similarly, the prototype module 104 may use partial template matching to match the remaining type characters of the ligature to other prototypes.

Returning to FIG. 2, the synthetic ligature 218 illustrates a result of the prototype module 104 using template matching to create a synthetic ligature, according to an example embodiment. As discussed above, the prototype module 104 creates the prototype 214 and the prototype 216, and labels them "e" and "c" (e.g., via OCR data), respectively. Blob 212 is identified by the prototype module 104 as an "ec" ligature (e.g., via OCR data) and uses template matching, as described above, to match a prototype of the same type character to the corresponding character of the ligature of blob 212. After determining prototype 214 ("e") and prototype 216 ("c") are the best match, the prototype module 104 combines the two prototypes into the synthetic ligature 218 ("ec"). The result is a higher quality ligature in synthetic ligature 218, despite originating from a sparse multi-character ligature within the scanned document 108.

In another embodiment, the partial template matching may include the prototype module 104 matching the characters of the ligature with the original blobs (characters) extracted from the scanned document 108. For example matching a blob from blob set 208 ("c") to the corresponding ligature character ("c") from blob 212 using any of the matching algorithms described above. Once the prototype module 104 determines a match for each character of the ligature, the prototype module 104 may then use the prototype 216 ("c") generated from the cluster 206 and prototype 214 ("e") to create the synthetic ligature 218 ("ec").

Although the synthetic ligature (e.g., synthetic ligature 218) includes two or more characters, it may be considered a single synthetic font element. In another embodiment, after the partial template matching, the prototype module 104 may separate the synthetic ligature into two individual matching prototypes and optionally set the prototypes upon the page according to the original ligature's (e.g., blob 212) orientation and/or geometric features.

After all prototypes and synthetic ligatures representing the scanned document 108 have been created, the prototype module 104 may then create a synthetic font library 116 along with corresponding position data 118. The position data 118 may include data such as, absolute page coordinates (e.g., coordinates of a reference pixel such as the lower left pixel of the prototype) or relative coordinates for placement of the prototype with respect to the preceding character and the local baseline.

In one embodiment, a document display application 120 utilizes a page display module 122 to create a new document using the higher quality characters of the synthetic font library 116 while still perceptually matching the original spatial orientation of the scanned document 108. To create the new document, according to one embodiment, the page display module 122 accesses the synthetic font library 116 and position data 118 and lays out the new document using a Page Description Language (PDL), such as Adobe® PostScript, Hewlett-Packard® PCL (Printer Control Language), and Microsoft® XML (Extensible Markup Language) Paper Specification. The document display application 120 then may interpret the PDL to create a visual representation of the new document on a user display (not shown).

Figure 3A:
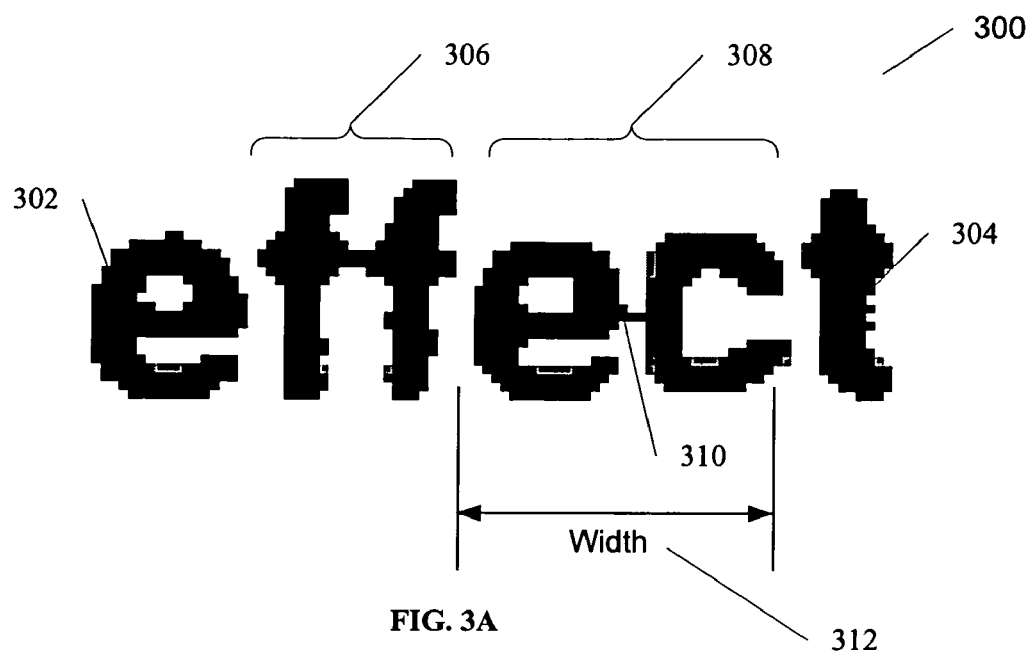
FIG. 3A is a diagrammatic representation of scanned images representing a portion of a scanned document, according to an example embodiment.

FIG. 3A illustrates an image 300 composed of scanned images. representing a portion of a scanned document (e.g., scanned document 108). The image 300 includes examples of type character blobs and ligature blobs. Blob 302 is a type character "e," blob 304 is a type character "t," blob 306 is a ligature composed of two touching "f"s, and blob 308 is a ligature composed of a touching "e" and "c." The poor image quality can be seen by examining the boundaries of the blobs. For example, boundary 310 of blob 308 (ligature) shows the type character "e" touching the type character "c," in addition to its generally rough boundaries.

As described above, in an example embodiment, the synthetic font generator 102 may capture position data 118, such as the width of each blob (e.g., width 312), which may be used by the page display module 122 to more accurately recreate the look of the scanned document 108.

Figure 3B:
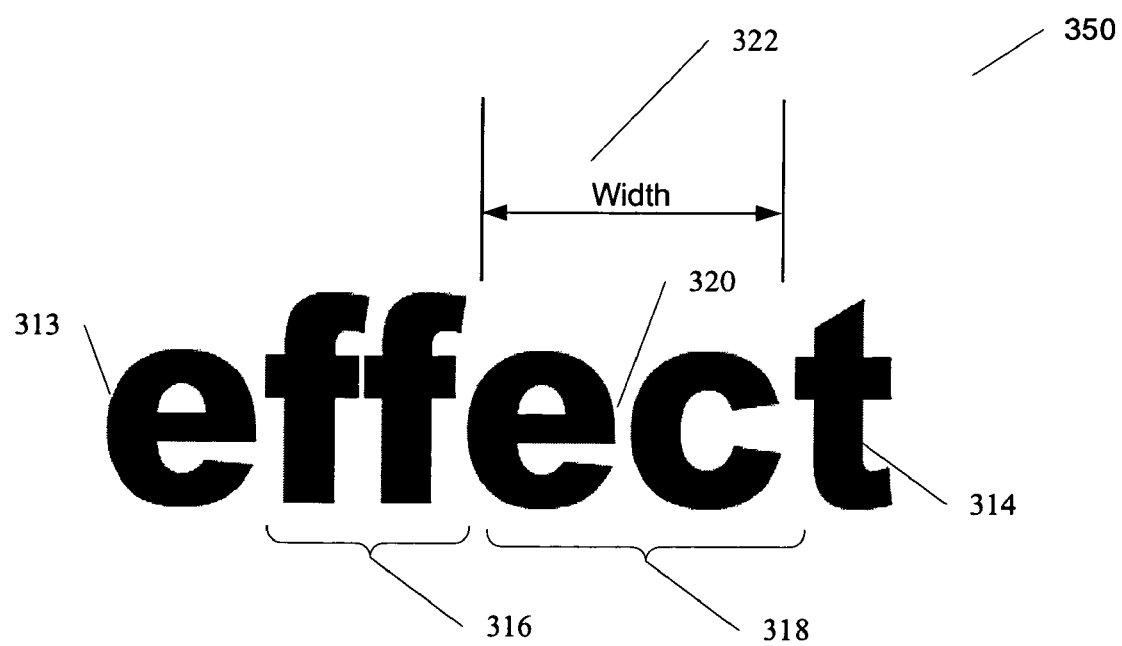
FIG. 3B is a diagrammatic representation of an example of a new image of the portion of a scanned document as illustrated in FIG. 3A created in accordance with an example embodiment.

FIG. 3B illustrates a new image 350 of the portion of a scanned document as illustrated in FIG. 3A. In one embodiment, the document display application 120 creates the new image based on the synthetic font library 116 and position data 118 generated by the prototype module 104. Synthetic fonts 313, 314, 316 and 318 illustrate the improved quality of the synthetic fonts, relative to the blobs shown in FIG. 3A, created by the system and methods described herein. For example, boundary 320 of synthetic font 318 illustrates an improvement over the boundary 310 of the corresponding blob 308 in the image 300. In one embodiment, in creating the synthetic font library 116, the prototype module 104 preserves the original dimensions of the created prototypes and synthetic ligature. For example, the width 312 of blob 308 is preserved in the corresponding width 322 of synthetic font 318. Additionally, in an example embodiment, the document display application 120 may use the position data 118 to place each synthetic font (e.g., synthetic font 318) within the new image 350, such that the original type character positions of the scanned document 108 along with the synthetic font with dimensions are duplicated to create a perceptually matching document to that of the scanned document 108.

Figure 4:
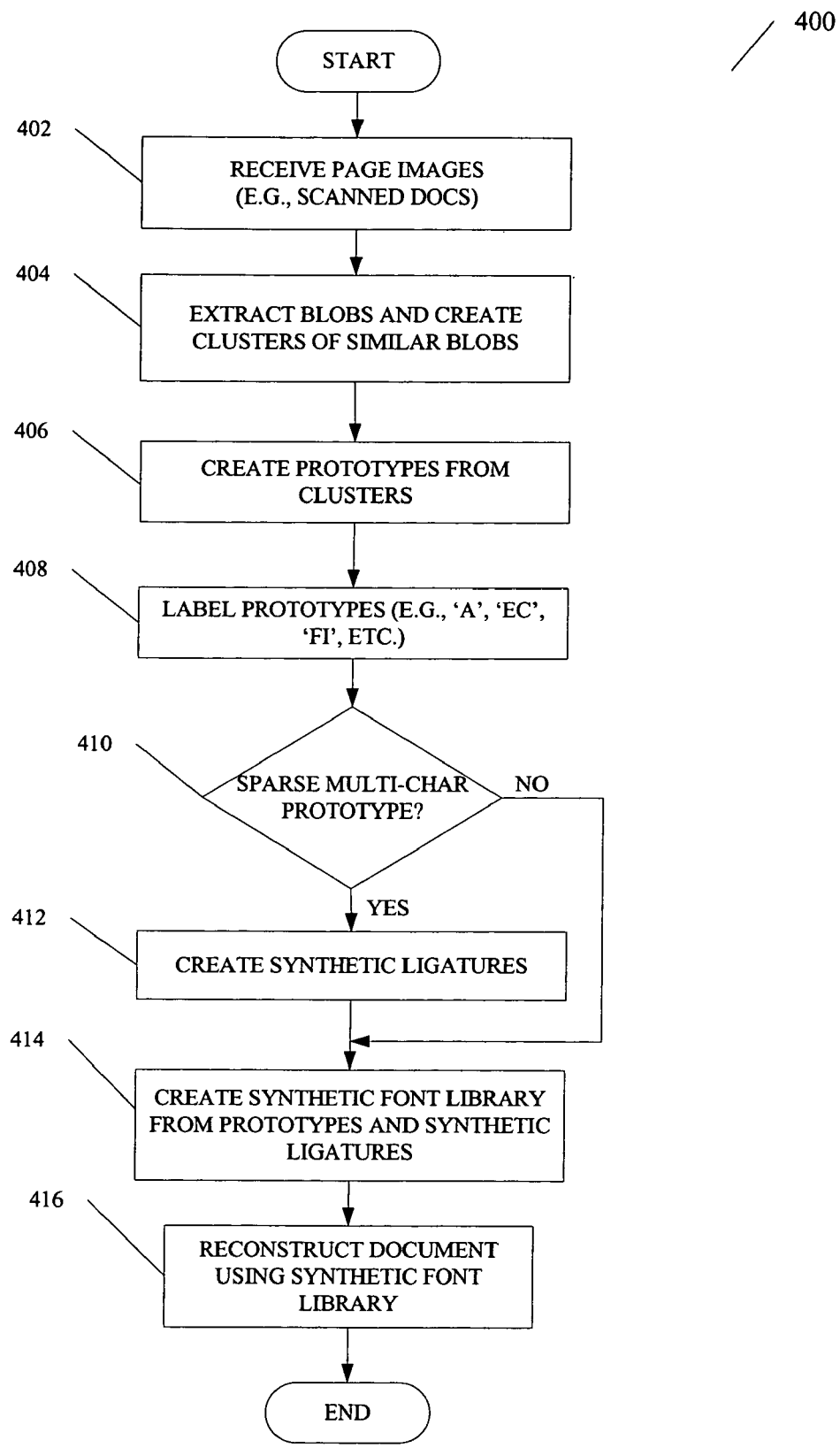
FIG. 4 is a flow chart illustrating a method, according to an example embodiment to reconstruct a scanned document based on the creation of a synthetic font library and blob position data.

FIG. 4 is a flow chart illustrating a method 400, according to an example embodiment, to reconstruct a scanned document based on the creation of a synthetic font library 116 and blob position data 118. It will be noted that specific example embodiments detailing each process described hereafter have been discussed above with reference to FIGS. 1, 2, and 3.

Moving on to operation 402, page images of a scanned document are processed to extract blobs, which are then grouped according to similarity into clusters at operation 404. The clusters are processed, at operation 406, to create prototypes that are higher quality replicas of the true shapes of the blobs represented in each cluster. At operation 408, in one embodiment, each prototype (e.g., for characters and ligatures) are labeled according to which type character each matches (e.g., type character "e"). In another embodiment, in an earlier operation (not shown), the prototypes are labeled according to labels given to each cluster composed of similar blobs.

At operation 410, if the prototype is a sparse multi-character prototype (e.g., ligature "ec"), then synthetic ligatures are created (e.g., see FIG. 5) at operation 412. If the prototype is not a sparse multi-character prototype, then at operation 414, along with a synthetic ligatures created at operation 412, a synthetic font library 116 is the created. The synthetic font library 116 is composed of the labeled single character prototypes and the synthetic ligatures. Finally, at operation 416, the scanned document is reconstructed using the synthetic font library 116 to create a higher quality document perceptually similar to the original scanned document.

Figure 5:
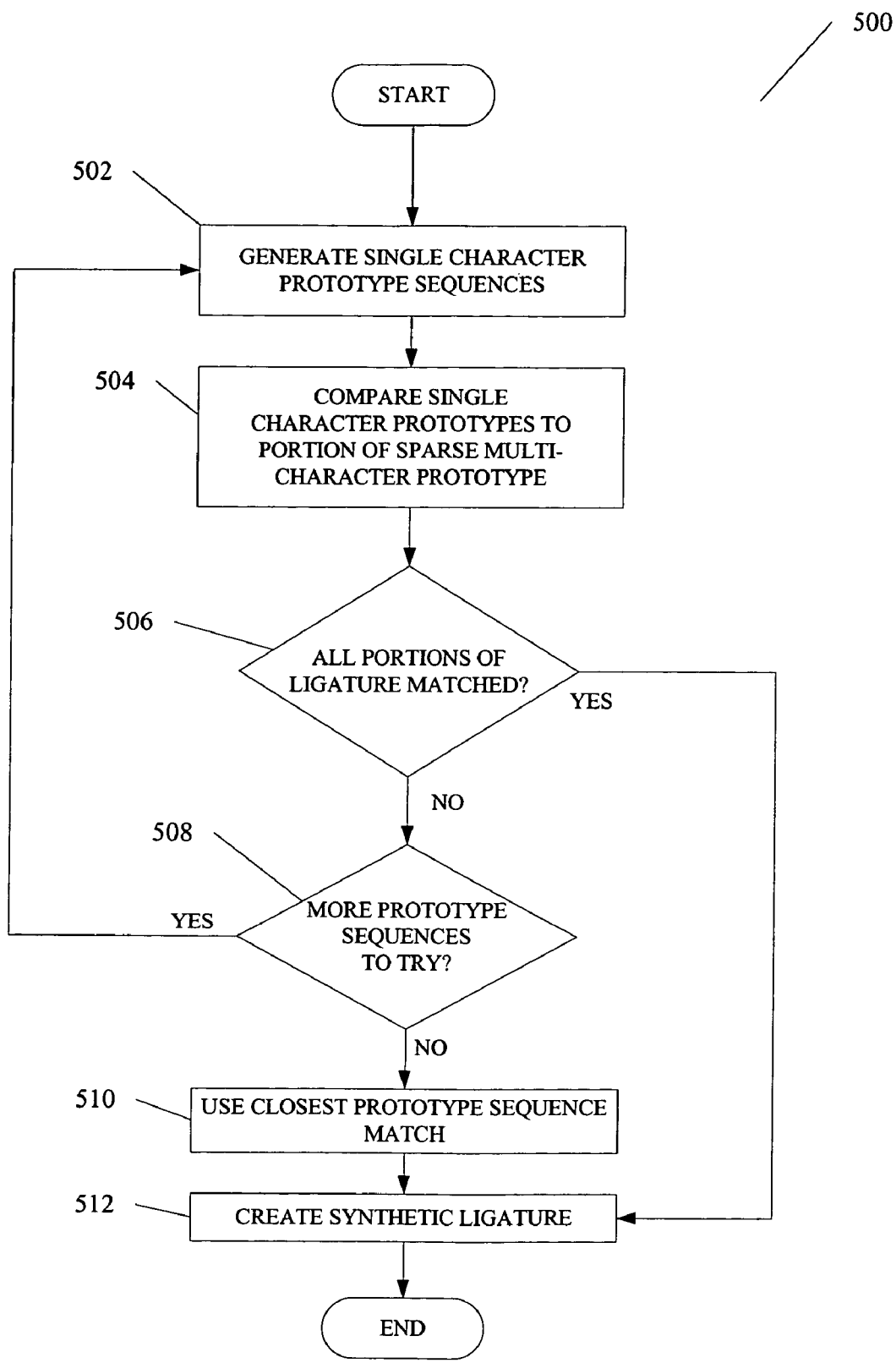
FIG. 5 is a flow chart illustrating a method, according to an example embodiment, to create a synthetic ligature.

FIG. 5 is a flow chart illustrating a method 500 to create a synthetic ligature, according to an example embodiment. It will be noted that specific example embodiments detailing each process described hereafter have been discussed above with reference to FIGS. 1, 2, and 3.

Moving to operation 502, in one embodiment, single character prototype sequences may be generated based on created prototypes and their-respective labels (e.g., type characters). In another embodiment, single character prototype sequences may be generated based on a representative blob from each created cluster of similar blobs.

At operation 504, elements of a single character prototype sequence are compared to corresponding portions of the sparse multi-character prototype. At operation 506, if all portions of the sparse multi-character prototype have been matched, the process is complete and a synthetic ligature is created at operation 512. Otherwise the process is repeated using another single character prototype sequence. When all single character prototype sequences have been tried, a decision may be made at operation 508 to use the closest match (operation 510) to create the synthetic ligature at operation 512.

Figure 6:
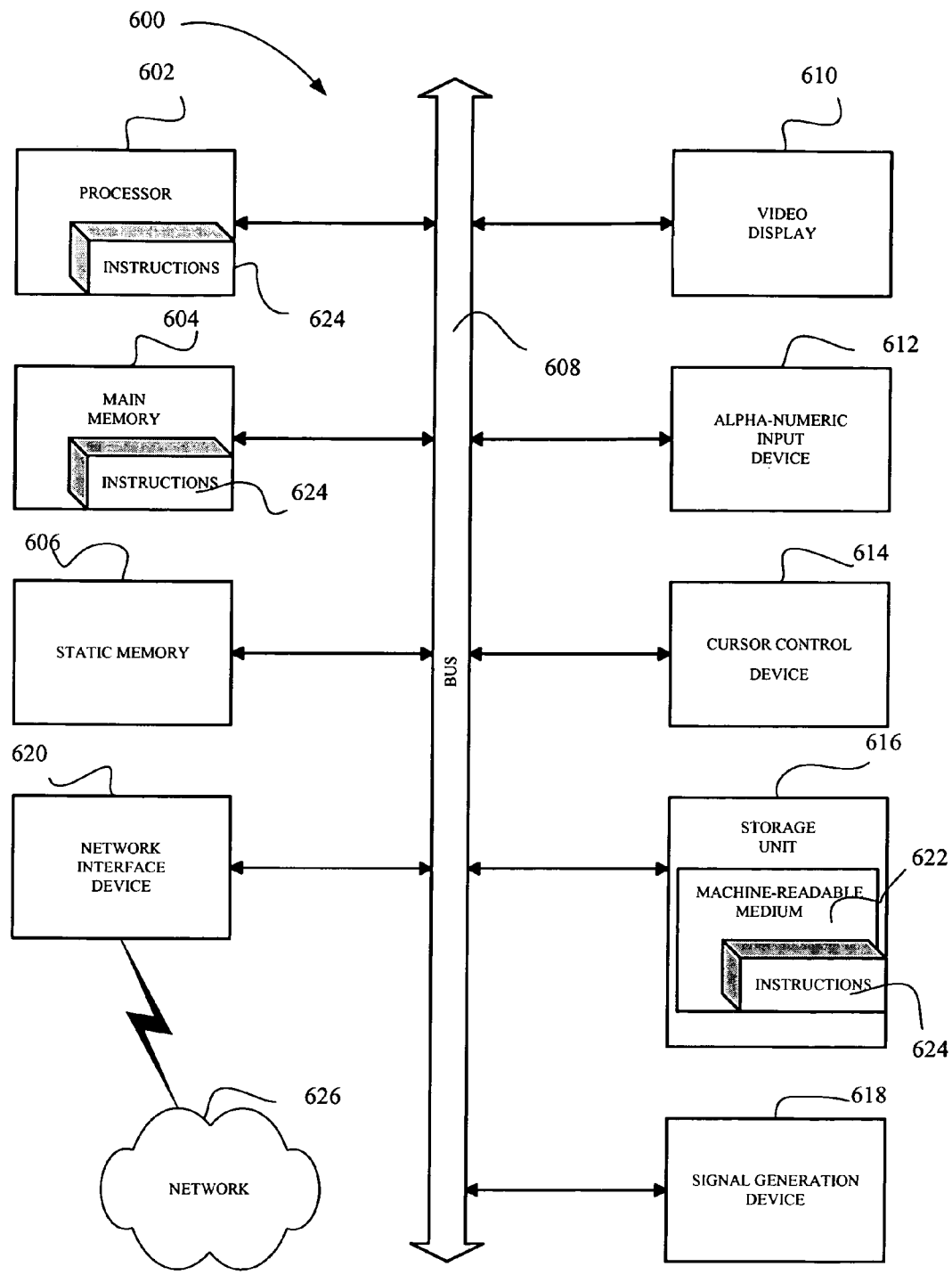
FIG. 6 shows a diagrammatic representation of machine in the example form of a computer system within which a set of instructions, for causing the machine to perform any one or more of the methodologies discussed herein, may be executed

FIG. 6 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories and optical and magnetic media.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method, comprising:
    identifying a scanned image of a ligature within a scanned document, the ligature including two or more touching characters;
    forming a ligature cluster from a number of scanned images similar to the scanned image of the ligature;
    identifying that the number of the scanned images forming the ligature cluster falls below a threshold; and
    based on the identifying that the number of the scanned images forming the ligature cluster falls below the threshold:
        comparing a plurality of prototypes to the two or more touching characters of the ligature to identify two or more matched prototypes, and
        creating a synthetic ligature, by a processor, based on the two or more matched prototypes, the synthetic ligature being used to reconstruct the scanned document.

2. The method of claim 1, further comprising:
    forming a plurality of clusters, each cluster of the plurality of clusters including one or more similar scanned images; and
    creating the plurality of prototypes based on processing the one or more similar scanned images of the plurality of clusters.

3. The method of claim 2, further comprising labeling the plurality of clusters according to a character or ligature type based on comparing attributes of a scanned image in the cluster to known character and ligature types.

4. The method of claim 2, further comprising labeling the plurality of clusters as a type character or ligature using optical character recognition (OCR) data associated with the scanned document.

5. The method of claim 2, further comprising labeling the plurality of prototypes as a type character or ligature using optical character recognition (OCR) data associated with the scanned document.

6. The method of claim 2, wherein the comparing the plurality of prototypes to the two or more touching characters of the ligature to identify two or more matched prototypes further comprises:
    identifying two or more type characters corresponding to the two or more touching characters of the ligature; and
    matching the two or more identified type characters to corresponding prototypes of the plurality of prototypes to identify the two or more matched prototypes.

7. The method of claim 6, further comprising creating a synthetic font library from prototypes corresponding to respective single type characters and each respectively created synthetic ligature.

8. The method of claim 7, further comprising creating a new image corresponding to the scanned document using the synthetic font library.

9. The method of claim 2, wherein the processing of the similar scanned images of the plurality of clusters to create the plurality of prototypes further comprises averaging one or more attribute values associated with the scanned images of the cluster.

10. The method of claim 9, wherein the one or more attribute values include at least one of a character pixel value, a character dimension value, a ligature pixel value, and a ligature dimension value.

11. The method of claim 10, wherein if a particular scanned image in the cluster is a ligature and if a number of scanned images in the cluster exceeds a minimum threshold value, the creating the synthetic ligature further comprises averaging the one or more attribute values associated with the scanned images of the cluster.

12. The method of claim 1, wherein comparing the plurality of prototypes to the two or more touching characters of the ligature to identify two or more matched prototypes further comprises:
    overlaying a prototype of the plurality of prototypes onto a first character of the two or more characters of the synthetic ligature; and
    examining, pixel by pixel, respective pixels of the prototype and the first character of the ligature.

13. The method of claim 12, further comprising calculating a placement of the first character by:
    examining pixels in common between the overlaid prototype and the first character to calculate counters $xP$, $xN$, $yP$, and $yN$, and a vertical and a horizontal stability index; and
    using the counters $xP$, $xN$, $yP$, and $yN$ and the vertical and horizontal stability indexes to determine a placement for the overlaid prototype within the synthetic ligature.

14. A system, comprising:
    at least one processor; and
    a memory in communication with the at least one processor, the memory being configured to store a cluster module and a prototype module that are executable by the at least one processor,
    the cluster module having instructions that when executed by the at least one processor, cause operations to be performed, the operations comprising
    identifying a scanned image of a ligature within a scanned document, the ligature composed of two or more touching characters, to form a ligature cluster from a number of scanned images similar to the scanned image of the ligature, and, based on identifying that the number of the scanned images forming the ligature cluster falls below a threshold, to match from a plurality of prototypes two or more matched prototypes corresponding to the two or more touching characters of the ligature, the prototype module having instructions that when executed by the at least one processor, cause operations to be performed, the operations comprising creating, based on identifying that the size of the group forming the ligature cluster falls below the threshold, a synthetic ligature from the two or more matched prototypes, the synthetic ligature being used to reconstruct the scanned document.

15. The system of claim 14, wherein the operations associated with the cluster module further comprising forming a plurality of clusters, each cluster of the plurality of clusters including one or more similar scanned images, and wherein the operations associated with the prototype module further comprising creating the plurality of prototypes based on processing the one or more similar scanned images of the plurality of clusters.

16. The system of claim 15, wherein the operations associated with the cluster module further comprising labelling the plurality of clusters of similar scanned images according to a character or ligature type based on a comparison of attributes of a scanned image in the cluster to known character and ligature types.

17. The system of claim 15, wherein the operations associated with the cluster module further comprising labelling the clusters of similar scanned images as a type character or ligature based on optical character recognition (OCR) data associated with the scanned document.

18. The system of claim 15, wherein the operations associated with the cluster module further comprising labelling the plurality of prototypes as a type character or ligature based on optical character recognition (OCR) data associated with the scanned document.

19. The system of claim 18, wherein the operations associated with the prototype module further comprising comparing the plurality of prototypes to the two or more touching characters of the ligature to identify two or more matched prototypes, the operation of comparing further comprising:

identifying two or more type characters corresponding to the two or more touching characters of the ligature; and matching the two or more identified type characters to corresponding labelled prototypes to identify the two or more matched prototypes.

20. The system of claim 19, wherein the operations associated with the prototype module further comprising creating a synthetic font library from prototypes corresponding to respective single type characters and respectively created synthetic ligatures.

21. The system of claim 20, wherein the memory is configured to store a page display module that is executable by the at least one processor, the page display module having instructions that when executed by the at least one processor, cause operations to be performed, the operations comprising creating a new image corresponding to the scanned document using the synthetic font library.

22. The system of claim 15, wherein the operations associated with the prototype module further comprising processing the similar scanned images of the cluster to create the prototype is to average one or more attribute values associated with the scanned image in the cluster.

23. The system of claim 22, wherein the one or more attribute values include at least one of a character pixel value, a character dimension value, a ligature pixel value, and a ligature dimension value.

24. The system of claim 23, wherein if a particular scanned image in the cluster is a ligature and if a number of scanned images in the cluster exceeds a threshold value, the operations associated with the prototype module further comprising creating the synthetic ligature is to average the one or more attribute values associated with the scanned images of the cluster.

25. The system of claim 14, wherein the operations associated with the prototype module further comprising comparing a plurality of prototypes to the two or more touching characters of the ligature to identify two or more matched prototypes, the operation of comparing further comprising:

overlaying a prototype of the plurality of prototypes onto a first character of the two or more characters of the synthetic ligature using an initial placement based on one or more edges of the first character; and examining, pixel by pixel, respective pixels of the prototype and the first character of the ligature.

26. The system of claim 25, wherein the operations associated with the prototype module further comprising calculating a best placement of the matched character by:

examining pixels in common between the overlaid prototype and the character of the ligature to calculate counters xP, xN, yP, and yN, and a vertical and a horizontal stability index; and using the counters xP, xN, yP, and yN and the vertical and horizontal stability indexes to determine a placement for the overlaid prototype within the synthetic ligature, wherein the placement approximates the original placement of the ligature within the scanned document.

27. A non-transitory, machine-readable medium embodying instructions that, when executed by a machine, cause the machine to perform operations, comprising:

identifying a scanned image of a ligature within a scanned document, the ligature including two or more touching characters;

forming a ligature cluster from a number of scanned images similar to the scanned image of the ligature;

identifying that the number of the scanned images forming the ligature cluster falls below a threshold; and based on the identifying that the number of the scanned images forming the ligature cluster falls below the threshold:

comparing a plurality of prototypes to the two or more touching characters of the ligature to identify two or more matched prototypes, and creating a synthetic ligature, by a processor, based on the two or more matched prototypes, the synthetic ligature being used to reconstruct the scanned document.

28. The non-transitory, machine-readable medium of claim 27, wherein comparing the plurality of prototypes to the two or more touching characters of the ligature to identify two or more matched prototypes further comprises:

overlaying a prototype of the plurality of prototypes onto a first character of the two or more characters of the synthetic ligature; and examining, pixel by pixel, respective pixels of the prototype and the first character of the ligature.

29. The non-transitory, machine-readable medium of claim 27, further comprising:

forming a plurality of clusters, each cluster of the plurality of clusters including one or more similar scanned images; and creating the plurality of prototypes based on processing the one or more similar scanned images of the plurality of clusters.

30. The non-transitory, machine-readable medium of claim 29, further comprising labeling the plurality of clusters according to a character or ligature type based on comparing attributes of a scanned image in the cluster to known character and ligature types.

31. The non-transitory, machine-readable medium of claim 29, wherein the comparing the plurality of prototypes to the two or more touching characters of the ligature to identify two or more matched prototypes further comprises:

identifying two or more type characters corresponding to the two or more touching characters of the ligature; and matching the two or more identified type characters to corresponding prototypes of the plurality of prototypes to identify the two or more matched prototypes.

32. The non-transitory, machine-readable medium of claim 31, further comprising creating a synthetic font library from prototypes corresponding to respective single type characters and each respectively created synthetic ligature.

33. The non-transitory, machine-readable medium of claim 32, further comprising creating a new image corresponding to the scanned document using the synthetic font library.

34. A computer system comprising:

means for identifying a ligature within a scanned document, the ligature including two or more touching characters;

means for matching the two or more touching characters of the ligature to a plurality of prototypes to identify corresponding two or more matched prototypes; and means for creating a synthetic ligature from the two or more matched prototypes based on identifying that a number of scanned images similar to the ligature is below a threshold, the synthetic ligature being used to reconstruct the scanned document.

* * * * *